United States Patent [19]

Kitai et al.

[11] 4,355,872
[45] Oct. 26, 1982

[54] CAMERA EQUIPPED WITH ELECTRONIC SHUTTER HAVING AUTOMATIC FOCUS DETECTING DEVICE

[75] Inventors: Kiyoshi Kitai; Tadashi Nakagawa; Hiroaki Ishida, all of Shikawatashi, Japan

[73] Assignee: Seiko Koki Kabushiki Kaisha, Japan

[21] Appl. No.: 5,778

[22] Filed: Jan. 23, 1979

[30] Foreign Application Priority Data

Jan. 24, 1978 [JP] Japan ............................ 53-6409

[51] Int. Cl.³ .......................... G03B 7/08; G03B 7/00
[52] U.S. Cl. ........................................ 354/25; 354/48
[58] Field of Search ............................. 354/25, 48–52, 354/195, 234–235; 250/201, 204

[56] References Cited

U.S. PATENT DOCUMENTS

| | | | |
|---|---|---|---|
| 3,896,457 | 7/1975 | Yamanishi et al. | 354/25 |
| 4,059,756 | 11/1977 | Wilwerding | 250/201 |
| 4,075,639 | 2/1978 | Peterson | 354/25 |
| 4,123,650 | 10/1978 | Hosoe | 354/25 X |
| 4,324,463 | 4/1982 | Lermann et al. | 354/25 |

*Primary Examiner*—L. T. Hix
*Assistant Examiner*—Thomas H. Tarcza
*Attorney, Agent, or Firm*—Robert E. Burns; Emmanuel J. Lobato; Bruce L. Adams

[57] ABSTRACT

A camera equipped with an electronic shutter having an automatic focus detecting device capable of automatic focusing of the photographing lens through detection of the distance between the object being photographed and the camera comprises an electronic module for the automatic focus detection system, an electronic module for the automatic exposure control system, an electromagnet connected to both of the electronic modules, and an obstructing means capable of constraining the electromagnet at a first position during the course of displacement of the electromagnet from a first position to a second position. According to the camera release operation or the operation caused by the camera release operation, the electronic module for the automatic focus detection system controls the electromagnet so as to determine the focus position and the electronic module for the exposure control system controls the electromagnet so as to adjust the exposure after the electromagnet is constrained by the obstructing means at the first position.

2 Claims, 4 Drawing Figures

CAMERA EQUIPPED WITH ELECTRONIC SHUTTER HAVING AUTOMATIC FOCUS DETECTING DEVICE

BACKGROUND OF THE INVENTION

This invention relates to a camera having a system capable of automatic focusing of the photographing lens.

Automatic focusing of the photographing lens by the action of the electromagnet actuated by electric signals generated at the detection of the distance between the object being photographed and the camera facilitates the operation of the camera, however, in comparison with the conventional manual focusing camera, such problems exist as complication of the mechanism, an increase in the manufacturing costs and enlargement of the body of the camera required so as to accommodate the additional mechanisms of the automatic focusing system.

An object of the present invention is to reduce the manufacturing costs by simplification of the construction and to reduce the dimensions of the construction in providing the automatic focus detecting device for the camera equipped with an electronic shutter which controls the exposure automatically by means of electronic modules.

This invention provides an automatic focusing camera capable of automatic focusing of the photographing lens through detection of the distance between the object being photographed, and the camera camera comprising an electronic module for automatic focus detection, an electronic module for automatic exposure control and an electromagnet connected to both of the electronic modules so that after the focus position of the photographing lens is determined by the electromagnet controlled by the electronic module for focus detection actuated according to the camera release operation or the operation caused by the camera release operation, the electromagnet is controlled so as to function in the exposure adjustment by the electronic module for the automatic exposure control.

The electromagnet includes a control member capable of shifting from a first position to a second and stop positions successively. The control member is retained at the second position by an obstructing means until the connection of the electromagnet to the electronic module for the focus detection is changed-over to the electronic module for the exposure control.

Furthermore, there is provided a locking member controlled by the control member to interrupt the successive operation of the system when the attraction of the control member at the first position fails.

BRIEF DESCRIPTION OF THE DRAWINGS

In the drawing illustrating the embodiments according to the present invention.

Explanation will be made on the construction and performance of an embodiment according to the present invention referring to the attached drawings.

Figure 1:
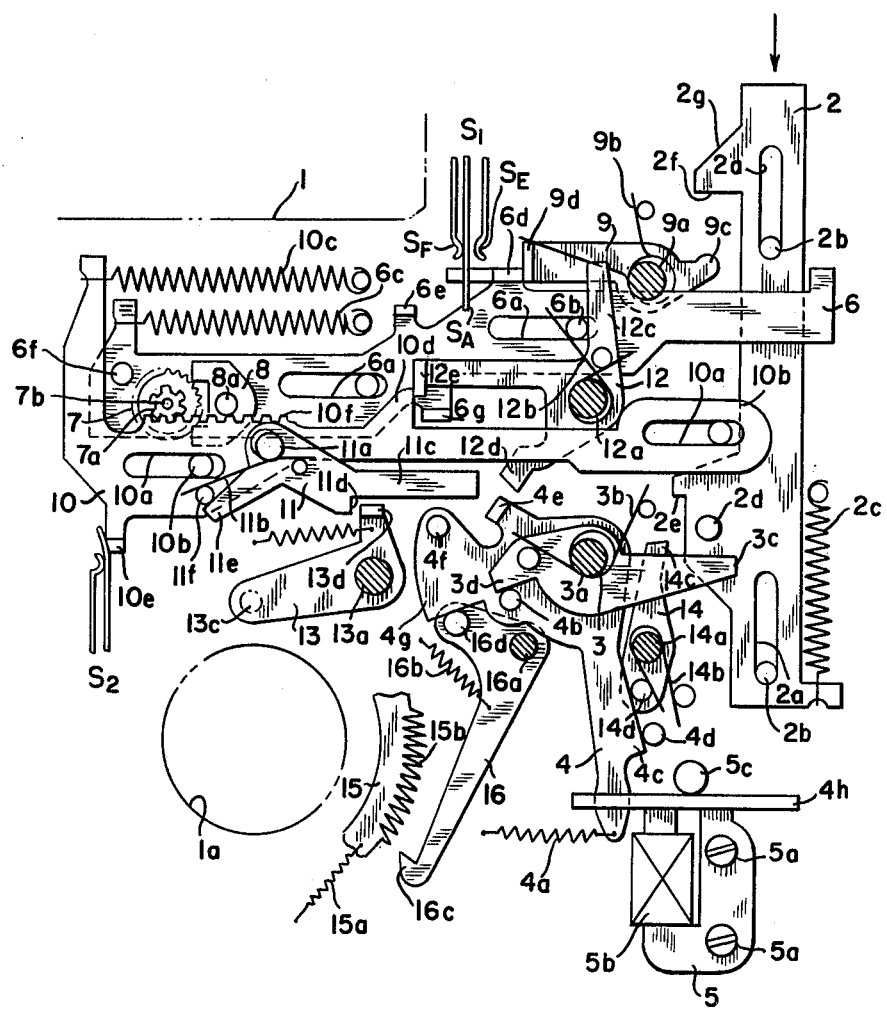
FIG. 1 is a plan view of the shutter system in the charged state.

Referring first to FIG. 1, an aperture (1a) is provided on the base plate (1) and is normally closed by a shutter blade, not shown.

A release plate (2), having a projecting pin (2d), a protrusion (2e), an operating part (2f), and an inclined part (2g), is slidably guided on the base plate (1) by the sliding engagement of slots (2a) with guide pins (2b) and urged upwards by a spring (2c).

A pressing lever (3), having an arm (3c) to engage with the projecting pin (2d) and a pressing part (3d), is rotatably fitted on the base plate (1) by a shaft (3a) and urged counterclockwise by a spring (3b).

A control member (4) is rotatably fitted on the base plate (1) by the shaft (3a) and urged clockwise by a spring (4a) which is weaker than the spring (3b) so that the control member (4) is pressed counterclockwise by the pressing part (3d) at a pin (4b) and stopped by a pin (4d) at an arm (4c). The control member (4) has a raised part (4e), a pin (4f), a pressing part (4g) and an armature (4h) fitted at the end of the arm (4c).

An electromagnet (5) having an excitation coil (5b) is fixed on the base plate (1) by screws (5a). The armature (4h) is slidable between the electromagnet (5) and a fixed pin (5c).

A setting plate (6), having a raised part (6d), an operating raised part (6e), a pin (6f) and a charging raised part (6g), is slidably guided on the base plate (1) by the engagement of slots (6a) with pins (6b) and urged rightwards by a spring (6c). An escape wheel (7) and a pinion (7a) are connected together as one body and are rotatably mounted on the setting plate (6) by a shaft (7b). An anchor (8) engaging with the escape wheel (7) also is mounted on the setting plate (6) by a shaft (8a).

A retainer (9), having an arm (9c) engaging with the operating part (2f) of the release plate (2) and a raised end (9d) retaining the setting plate (6) at the raised part (6d), is rotatably fitted on the base plate (1) by a shaft (9a) and urged counterclockwise by a spring (9b).

A contact piece (SA) of a switch (Sl) projects in the path of movement of the operating raised part (6e) of the setting plate (6). Normally, the contact piece (SA) is in contact with the contact piece (SF) and the action of the operating raised part brings the contact piece (SA) in contact with the contact piece (SE).

An actuating member (10), having a protrusion (10d), an arm (10e) and a rack (10f) engaging with the pinion (7a), is slidably fitted on the base plate (1) by pins (10b) fitted in slots (10a) and urged clockwise by a spring (10c).

An opening lever (11), having an actuating arm (11c) engaged with the pin (4f) of the control member (4), a stepped part (11d) and a stopping arm (11e), is rotatably fitted on the actuating member (10) by a shaft (11a) and urged clockwise by spring (11b). The opening member (11) is normally retained at the charged position with the stopping arm (11e) resting on a pin (11f) fixed to the actuating member (10).

An obstructing member (12), having a first arm (12c) engaging with the raised part (6d) of the setting plate (6), a second arm (12d) engaging with the raised part (4e) of the control member (4) and an arm (12c) engaging with the protrusion (10d) of the actuating member (10), is rotatably fitted on the base plate (1) by a shaft (12a) and urged counterclockwise by a spring (12b). The obstructing member (12) is normally retained at the charged position with the first arm (12c) resting on the pin (6b).

The arm (10e) of the actuating member (10) forcedly keeps closed the contact pieces of a switch (S2) which is adapted to open in the free state.

A shutter blade operating lever (13), having a pin (13c) to control the shutter blade, not shown, and a raised part (13d) to be engaged with the stepped part (11d) of the opening lever (11), is rotatably fitted on the base plate (1) by a shaft (13a) and urged counterclockwise by a spring (13b).

A locking member (14), having a pawl (14c) to be engaged with the protrusion (2e) of the release plate (2), is rotatably fitted on the base plate (1) by a shaft (14a) and urged clockwise by a spring (14b). The locking member (14) is retained at the charged position with a pin (14d) resting on the arm (4c).

A lens control cam (15), having a ratchet (15b) and a photographing lens stopping part, not shown, is fitted rotatably about the aperture (1a) by a known means and urged clockwise by a spring (15a). In the charged state, the lens control cam (15) is forcedly turned to the position as shown in FIG. 1 against the spring (15a) by the release plate (2).

A pawl plate (16), having a pawl (16c) to be engaged with the ratchet (15b) and a projecting pin (16d), is rotatably fitted on the base plate (1) by a shaft (16a) and urged clockwise by a spring (16b). The pawl plate (16) is retained in the charged position with the projecting pin (16d) resting on the pressing part (4g) of the control member (4).

The photographing lens, not shown, is fitted coaxially with the aperture (1a) being urged clockwise and in the charged state, it is forcedly turned counterclockwise by the charging raised part (6g) of the setting plate (6).

Figure 2:
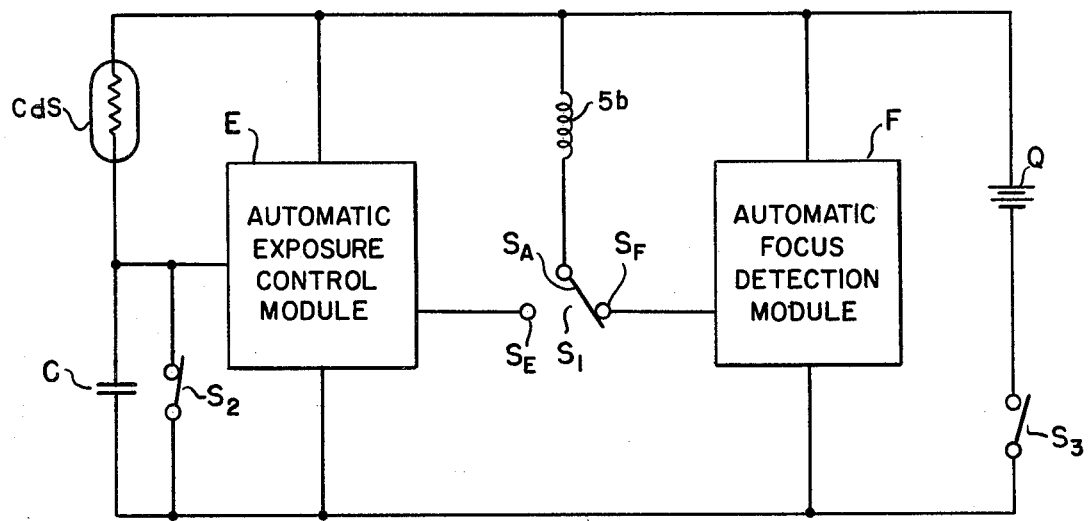
FIG. 2 is an electronic circuit applied to the shutter system of FIG. 1.

Referring now to FIG. 2, an automatic focus detection module (F) and an automatic exposure control module (E) are connected to a power source (Q) through a main switch (S3). A circuit changing switch (S1) connects the excitation coil (5b) of the electromagnet (5) to the automatic focus detection module (F) when the contact piece (SA) is in contact with the terminal (SF), and to the automatic exposure control module (E) when the contact piece (SA) is in contact with the terminal (SE). A circuit composed of a photoconductive element (CdS) and a condenser (C) connected in series and a switch (S2) provided to short-circuit the condenser (C) is connected to the input terminal of the automatic exposure control module (E). The like numerals and symbols in FIG. 2 correspond to those in FIG. 1.

In operation, commencing with the mechanism in the position shown in FIG. 1, when the release plate (2) is depressed in the direction of the arrow against the force of the spring (2c) according to the shutter release motion, in the initial stage of movement of the release plate (2), the main switch (S3) is closed to feed electricity to the automatic focus detection module (F) and the excitation coil (5b) so that the electromagnet (5) attracts the armature (4h), then the inclined part (2g) causes the focus detecting mechanism, not shown, to perform focus position scanning motion while the lens control cam (15) is turned clockwise pulled by the spring (15a) with the photographing lens stopping part shifting corresponding to the scanning motion, and when the automatic focus detection module (F) detects the focus position, the excitation coil (5b) is cut-off so that the electromagnet (5) is demagnetized.

The pin (2d) pushes the pressing lever (3) at the arm (3c) before the inclined part (2g) actuates the focus detecting mechanism to turn the pressing lever (3) clockwise about the shaft (3a) against the force of the spring (3b) so that the retention of the control member (4) at the pin (4d) with the pressing part (3d) is cancelled. Consequently, the control member (4) turns clockwise about the shaft (3a) pulled by the spring (4a) until the raised part (4e) comes to hit against the second arm (12d) of the obstructing member (12) when the electromagnet (5) is demagnetized and the attraction of the armature (4h) by the electromagnet (5) is cancelled. As the control member (4) turns, the pin (16d) follows the pressing part (4g) so that the pawl plate (16) is allowed to turn clockwise about the shaft (16a) pulled by the spring (16b) and the pawl (16c) engages with the ratchet (15b). This series of motions is performed in a moment. Although the locking member (14) is turned clockwise by the spring (14b) about the shaft (14a) following the clockwise rotation of the control member (4), the pawl (14c) will not be engaged with the protrusion (2e) as the protrusion (2e) has already passed across the operating locus of the pawl (14c).

As the release plate (2) is depressed further, the operating part (2f) engages with the arm (9c) to turn the retainer (9) clockwise against the spring force of the spring (9b) so that the retention of the setting plate (6) at the raised part (6d) with the raised end (9d) is cancelled while the pin (2d) pushes the pressing lever (3) at the arm (3c) to turn the pressing lever (3) clockwise against the spring force of the spring (3b) so that the pressing part (3d) retracts out of the operating range of the pin (4b).

The setting plate (6) starts moving rightwards pulled by the spring (6c) when the retention of the setting plate (6) at the raised part (6d) with the raised end (9d) is cancelled. The setting plate (6) moves rightwards at a fixed speed because the combined clockwise rotation of the escape wheel (7) with the pinion (7a) engaging with the rack (10f) is controlled by the anchor (8).

According to the movement of the setting plate (6), the photographing lens is allowed to move following the charging raised part (6g) until it comes to the focus position defined by the stopping part, not shown, of the lens control cam (15) which has already been adjusted and retained at the position corresponding to the focus position of the photographing lens.

As the setting plate (6) moves rightwards further, the operating raised part (6e) changes-over the circuit changing switch (S1) to connect the electromagnet (5) to the automatic exposure control module (E) so that the electromagnet (5) is magnetized again to attract the armature (4h), then the raised part (6d) pushes the obstructing member (12) at the first arm (12c) to turn the obstructing member (12) clockwise about the shaft (12a) against the force of the spring (12b) so that the engagement of the second arm (12d) and the raised part (4e) and the engagement of the arm (12e) and the protrusion (10d) are cancelled.

The control member (4) becomes free to turn, pulled by the spring (4a), when the retention at the raised part (4e) is cancelled, however, the control member (4) is not allowed to turn as the armature (4h) is attracted by the electromagnet (5).

The setting plate (6) stops when the respective left end edges of the slots (6a) hit against the correlated pins (6b).

When the retention at the protrusion (10d) is cancelled, the actuating member (10) moves rightwards pulled by the spring (10c) while causing the pinion (7b), which has previously moved to the right end of the rack (10f), to turn counterclockwise, therefore, the speed of the actuating member (10) is controlled at a fixed rate by the action of the escape wheel (7) and the anchor (8). At the initial stage of the movement of the actuating member (10), the arm (10e) opens the switch (S2) to actuate the automatic exposure control module (E) whereupon the condenser (C) is charged with electricity regulated by the photoconductive element (CdS) corresponding to the brightness of the object being photographed.

As the actuating member moves rightwards further, the stepped part (11d) of the opening lever (11) pushes the shutter blade operating lever (13) at the raised part (13d) causing the shutter blade operating lever (13) to turn clockwise about the shaft (13a) against the resistance of the spring (13b) so that the pin (13c) of the shutter blade operating lever (13) acts on the shutter blade, not shown, to open the aperture (1a) gradually and the exposure begins.

When the condenser (C) is charged at the charging rate corresponding to the brightness of the object being photographed and the potential reaches the level corresponding to the acting voltage of the automatic exposure control module (E), the excitation coil (5b) is cut-off and the electromagnet (5) is demagnetized so that the attraction of the armature (4h) by the electromagnet (5) is cancelled and the control member (4) is allowed to be turned by the spring (4a) about the shaft (3a) together with the armature (4h) fitted at the arm (4c).

The control member (4) turns clockwise without any constraint as the retention at the raised part (4e) and the pin (4b) has already been cancelled and the pin (4f) pushes the opening lever (11) at the operating arm (11c) to release the engagement of the stepped part (11d) and the raised part (13d). Accordingly, the shutter blade operating lever (13) turns counterclockwise quickly about the shaft (13a) pulled by the spring (13b) returning the shutter blade to its original position to close the aperture (1a) so that the exposure is completed.

The actuating member (10) moves rightwards still further and finally stops when the left edges of the slots (10a) hit against the pins (10b).

While the setting plate (6) is moving rightwards, the return motion of the release plate (2) is obstructed by a known means, not shown, and when the actuating members (10) completed its rightward movement, the release plate (2) becomes possible to make return motion, therefore, the release plate (2) returns to the position as shown in FIG. 1 pulled by the spring (2c) when the depression in the direction of the arrow is cancelled and the main switch is opened.

Consequently, the pressing lever (3) is released from the depression of the pin (2d) at the arm (3c) and turned counterclockwise by the spring (3b) pushing the control member (4) at the pin (4b) by the pressing part (3d) to turn the control member (4) counterclockwise about the shaft (3a) against the resistance of the spring (4a). Then, the control member (4) pushes the pawl plate (16) at the pin (16d) by the pressing part (4g) to turn the pawl plate (16) counterclockwise about the shaft (16a) against the resistance of the spring (16d), while pushing the locking member (14) at the pin (14d) by the arm (4c) to turn the locking member (14) counterclockwise about the shaft (14a) against the resistance of the spring (14b). Thus the component parts are all reset at their original positions respectively as shown in FIG. 1.

The exposure is completed once by the abovementioned series of operations. In charging the shutter, the setting plate (6) is pushed back leftwards against the resistance of the spring (6c) so that the actuating member (10) also is pushed back leftwards by the pin (6f) against the resistance of the spring (10c), the charging raised part (6g) returns the photographing lens, not shown, to the charged position where the photographing lens is strained so as to turn clockwise when it is released, the operating raised part (6e) changes-over the switch (S1) to connect the excitation coil (5a) of the electromagnet (5) to the automatic focus detection module (F), the raised part (6d) releases the retention of the obstructing member (12) at the first arm (12c), and finally, the setting plate (6) is retained by the engagement of the raised part (6d) with the raised end (9d) of the retainer (9).

According to the leftward movement of the actuating member (10), the opening lever (11) moves leftwards while it is turned counterclockwise about the shaft (11a) against the resistance of the spring (11b) by the engagement of the back of the stepped part (11d) with the raised part (13d), and when the stepped part moves over the raised part (13d), the opening lever (11) turns clockwise until it is stopped by the pin (11f) confronting the stopping arm (11e), the arm (10e) closes the switch (S2) and finally the actuating member (10) is retained by the engagement of the protrusion (10d) with the raised arm (12e). Thus, the shutter is charged as shown in FIG. 1.

Figure 3:
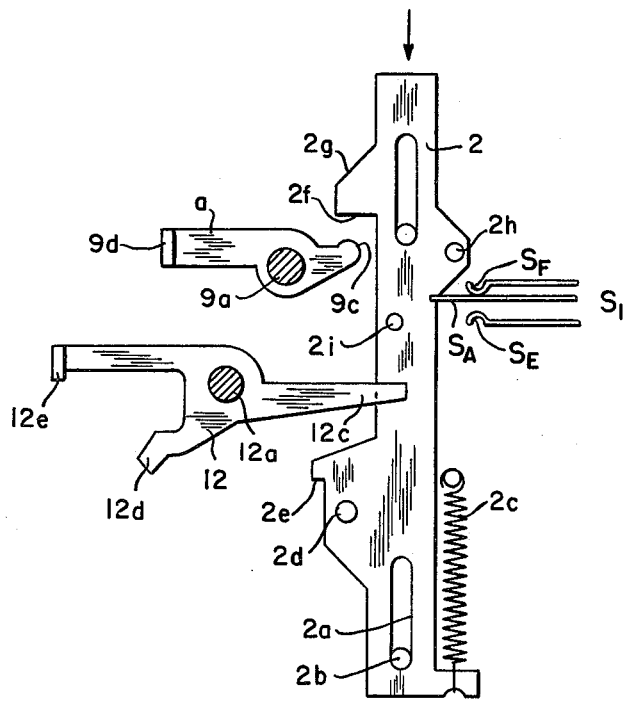
FIG. 3 is a partial plan view of a second embodiment of shutter system.

In FIG. 3 illustrating a modified form of the shutter according to the present invention, the members operating similarly to the members of the embodiment as shown in FIG. 1 are designated by the same numerals as in FIG. 1, therefore, explanation on the composition and operation of those members will be omitted to avoid duplication.

Referring now to FIG. 3, the release plate (2) is fixedly provided with pins (2h) and (2i). The contact piece (SA) is located in the course of movement of the pin (2h) so that the switch (S1) is actuated by the pin (2h). The first arm (12c) of the obstructing member (12) extends in the path of movement of the pin (2i).

In operation, according to the depression of the release plate (2), the main switch (S3) is closed as in the case of FIG. 1 and the electromagnet (5) is magnetized. The automatic focus detection module (F) controls the electromagnet (5) as explained above to stop the lens control cam (15) at the position correspondijng to the focus position for the photographing lens. According to the successive downward movement of the release plate (2), the pin (2h) changes-over the switch (S1) after the operating part (2f) pushes the arm (9c) of the retainer (9) so that the electromagnet (5) is connected to the automatic exposure control module (E) and is magnetized again, then the pin (2i) pushes the first arm (12c) to actuate the obstructing member (12) to perform the sequential operations as described above.

The subsequent operations of the mechanism are quite similar to those of the first embodiment.

Figure 4:
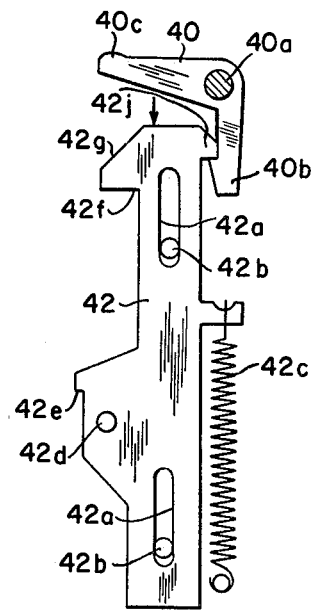
FIG. 4 is a partial plan view of FIG. 3.

In FIG. 4 illustrating a part of another modified form of the present invention, the members functioning similarly to the members of the embodiment as shown in FIG. 1 are designated by the numerals made up by adding 40 to each numeral used in FIG. 1.

Referring to FIG. 4, the release plate (42) is urged downwards by the spring (42c) and is retained at the shoulder part (42j) by the hook part (40b) of the hook lever (40). The hook lever (40) is rotatably fitted on the base plate (1) by the shaft (40a) and urged clockwise by a spring, not shown. An end (40c) is acted on in the shutter release operation.

Starting from the state as shown in FIG. 4, when the end (40c) of the hook lever (40) is depressed to release the shutter, the retention of the release plate (42) at the shoulder part (42j) by the hook part (40b) is cancelled so that the release plate (42) is allowed to move in the direction of the arrow pulled by the spring (42c), then follows a series of sequential operations of the mechanism as in the case of FIG. 1. In this case, when the entire performance of the shutter is completed, it is desirable to open the main switch (S3) in order to avoid useless consumption of the power source (Q). This may be attained easily by a known means, therefore, detailed description will be omitted.

In charging the shutter, the setting plate (6) is returned leftwards as in the case of FIG. 1 and the release plate (42) is moved upwards against the resistance of the spring (42c) until it is retained by the engagement of the hook part (40b) with the shoulder part (42j).

Explanation will be made of the case when the electromagnet (5) does not normally function due to some trouble of the electronic circuit or the exhaustion of the power source.

When the release plate (2) is depressed against the resistance of the spring (2c) according to the shutter release operation, the switch (S3) is closed to connect the automatic focus detection module (F) to the power source (Q), however, if the electromagnet (5) is not magnetized due to some trouble, the electromagnet (5) does not attract the armature (4h), consequently, when the pin (2d) pushes the pressing lever (3) at the arm (3c) to turn the pressing lever (3) clockwise about the shaft (3a), the control member (4) is allowed to be turned clockwise by the spring (4a) at the same time and the locking member (14) also is allowed to be turned clockwise by the spring (14b) about the shaft (14a) as the pin (14d) follows the arm (4c) so that the pawl (14c) projects within the course of movement of the protrusion (2e). Accordingly, the movement of the release plate (2) is obstructed by the pawl (14c) as the protrusion (2e) hits against the pawl (14c) before the retention of the setting plate (6) by the retainer (9) is cancelled so that the operation of the shutter is interrupted.

It may be apparent from what has been described hereinbefore that the use of a single electromagnet (5) for both the automatic focus detection and the automatic exposure control is effective in reducing the dimensions of the construction and the costs of machining and assembling of the component parts, and furthermore, the simplicity of the mechanism reduces the possibility of troubles, thereby providing, a reliable shutter.

The shutter of the present invention is remarkably reduced of erroneous operations caused by vibrations and shocks and, therefore, operates securely because the electromagnet is activated while the excitation coil is electrified and the control member is allowed to move when the electromagnet is demagnetized. Still further, the change-over of the connection of the electromagnet from the automatic focus detection module to the automatic exposure control module is securely performed as the control member is retained by the obstructing member until the change-over of the electromagnet from the connection to the automatic focus detecting module to the automatic exposure control module is completed after the electromagnet has completed its functional operation under the control of the automatic focus detection module, and the retention of the control member by the obstructing member is cancelled after the electromagnet is again magnetized.

According to the embodiments of FIGS. 1 and 3, the lens control cam is adjusted to the position corresponding to the focus position of the photographing lens during the operation of the release plate before the shutter is actuated, therefore, it is possible to facilitate the confirmation of the photographing distance by the indication in the viewfinder. In the focusing procedure, the focusing object may be positioned at the optional part of the focusing screen instead of positioning within a limited part of the focusing screen as in the conventional focusing systems, thus the focusing system according to the present invention facilitates the focusing procedure.

In the embodiments as described hereinbefore, the obstructing member retains the control member mechanically until the change-over of the electromagnet from the connection to the automatic focus detection module to the connection to the automatic exposure control module is completed, however, in modifications, electrical means may be employed in retaining the control member. For instance, a second electromagnet may be provided instead of the obstructing member to retain the control member at the position before the second position where the automatic exposure control is performed.

We claim:

1. A camera equipped with an electronic shutter having an automatic focus detecting device capable of automatic focusing of the photographing lens through detection of the distance between the object being photographed and the camera comprising: an electronic module for effecting automatic focus detection; an electronic module for effecting automatic exposure control; and means including an electromagnet successively connectable to both of said electronic modules as a function of the camera release operation such that said electromagnet is controlled by said electronic module for effecting automatic exposure control to adjust the exposure after said electronic module for effecting automatic focus detection has controlled said electromagnet to determine the focus position, said means including a control member movable successively from a first position to a second position and to a stop position and being prevented from undergoing movement when attracted by said electromagnet, and obstructing means for retaining said control member at said second position thereby obstructing further movement of said control member until the connection of said electromagnet to said electronic module for effecting automatic focus detection is changed-over to the connection of said electromagnet to said electronic module for effecting automatic exposure control.

2. A camera equipped with an electronic shutter having an automatic focus detecting device as set forth in claim 1; further including a locking member controlled by said control member so as to interrupt the successive operation of the shutter release in the event said electromagnet fails to attract said control member at said first position.

* * * * *